A. J. PATTERSON.
Thill-Couplings.

No. 140,382.  Patented July 1, 1873.

Witnesses.
Henry M. Thomas
Henry S. Redfield

Inventor.
Alex. J. Patterson,
per R. F. Osgood,
atty.

UNITED STATES PATENT OFFICE.

ALEXANDER J. PATTERSON, OF GENESEO, ASSIGNOR OF ONE-HALF HIS RIGHT TO EMERY W. OSBORNE, OF ROCHESTER, NEW YORK.

IMPROVEMENT IN THILL-COUPLINGS.

Specification forming part of Letters Patent No. 140,382, dated July 1, 1873; application filed April 23, 1873.

*To all whom it may concern:*

Be it known that I, ALEXANDER J. PATTERSON, of Geneseo, in the county of Livingston, and State of New York, have invented a certain new and useful Improvement in Thill-Couplings for Carriages; and I do hereby declare that the following is a full, clear, and exact description of the construction and operation of the same.

My invention consists of a thill-coupling having the eye of the thill fitting on a conical pin with packings at each end, and provided with a follower set up by a nut, and connected with an auxiliary stay-pin, as hereinafter described, said parts being combined to operate in the manner and for the purpose hereinafter more fully set forth.

Figure 1:
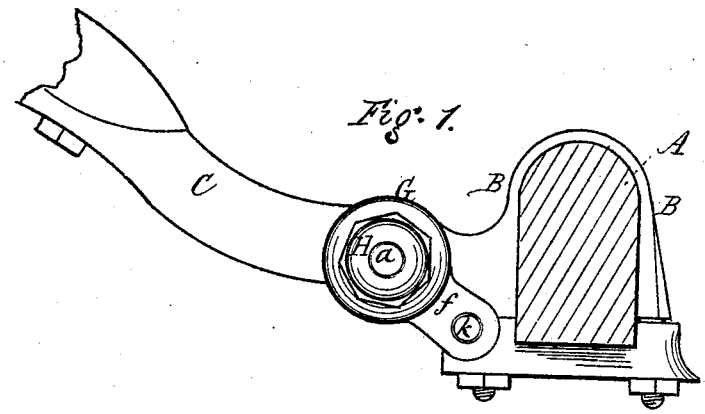
Figure 2:
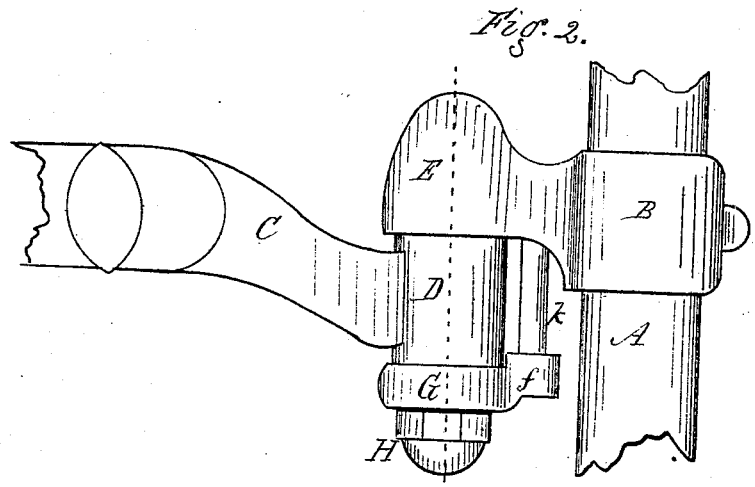
Figure 3:
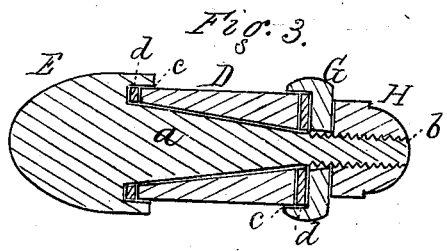

In the drawings, Fig. 1 is a side elevation; Fig. 2, a plan; Fig. 3, a section in the axis of the joint.

A is the axle; B, the clip; C, the thill-iron; and D, the eye of the same. These parts are of ordinary construction. The head E of the clip is formed with a conical or tapering pin, $a$, on which rests the eye of the thill, the interior of the latter being of similar conical form to make an accurate fit. The outer end of the conical pin is cut with a screw-thread, $b$, over which slides loosely a follower, G, outside of which screws a jam-nut, H. The inner faces of both the head E and follower G have countersinks $c\ c$ of sufficient size to admit the ends of the thill-eye to slide therein; and between the ends of the eye and the faces of the countersinks are inserted packings $d\ d$, as clearly shown in Fig. 3. By turning up the jam-nut it will be seen the eye of the thill will be closely inclosed in the countersinks and bear at the ends against the packings, thereby keeping the whole tight, and obviating any noise. Furthermore, the conical parts of the pin and the eye will fit closely together, and any wear of the parts is compensated for by tightening up the jam-nut. No rubber or other packings, such as are generally used, are required, but the packing and close fitting of the parts are much more effective than usual. The follower G has a lug or projection, $f$, provided with a hole which fits and slides upon a stay-pin, $k$, parallel with the conical pin $a$, and which is rigidly secured to, or forms a part of, the clip. As the follower is adjusted up on the taper pin the lug $f$ adjusts up in ths same manner upon the pin $k$, which thus serves as a stay or brace to hold the parts in position, and prevents displacement or twisting under strain. This is essential, since the eye slips upon the tapering pin one side of the coupling-head.

The device above described, from its ease of application and its effectiveness in keeping tight, thereby preventing any rattling or loose action, is of much value.

Having thus described my invention, what I claim as new, and desire to secure by Letters Patent, is—

The coupling-head E, having conical pin $a$, thill-eye D, packings $d\ d$, follower G, jam-nut H, and stay-pin $k$, combined and arranged to operate in the manner and for the purpose specified.

In witness whereof, I have hereunto signed my name in the presence of two subscribing witnesses.

ALEXANDER J. PATTERSON.

Witnesses:
R. F. OSGOOD,
HENRY M. THOMAS.